United States Patent [19]

Jalics

[11] 4,446,282

[45] May 1, 1984

[54] HIGH GREEN STRENGTH EMULSION RUBBERS BY THE USE OF HALF-ESTERS OF UNSATURATED DICARBOXYLIC ACIDS

[75] Inventor: George Jalics, Akron, Ohio

[73] Assignee: Goodyear Tire and Rubber Co., Akron, Ohio

[21] Appl. No.: 382,543

[22] Filed: May 27, 1982

[51] Int. Cl.$^3$ .............................................. C08F 8/44
[52] U.S. Cl. .............................. 525/327.7; 525/329.6; 525/329.2; 525/366; 525/368
[58] Field of Search ................ 525/327.7, 329.6, 329.2

[56] References Cited

U.S. PATENT DOCUMENTS

| | | | |
|---|---|---|---|
| 2,454,284 | 11/1948 | Kirk | 525/327.7 |
| 2,599,123 | 3/1952 | Pinkney et al. | 525/329.6 |
| 2,977,334 | 3/1961 | Zopf, Jr. et al. | 525/327.7 |
| 3,219,596 | 11/1965 | Hull et al. | 525/329.6 |
| 3,635,916 | 1/1972 | Schlumbom et al. | 525/327.7 |
| 3,883,472 | 5/1975 | Greene et al. | 525/329.6 |
| 3,904,588 | 9/1975 | Greene | 525/329.6 |
| 4,192,930 | 3/1980 | Beck et al. | 525/327.7 |

*Primary Examiner*—Joseph L. Schofer
*Assistant Examiner*—Bernard Lipman
*Attorney, Agent, or Firm*—Daniel J. Hudak; Alvin T. Rockhill

[57] ABSTRACT

The green strength of polymers produced by emulsion polymerization processes is improved through the use of carboxyl containing compounds. Specifically, the compounds are half esters of unsaturated dicarboxylic acids wherein the half ester moiety renders the carboxyl containing compound hydrophobic. As a result, carboxylic copolymers can be produced in emulsion polymerizations having a basic (pH$\geq$7.0) aqueous medium. Heretofore, use of carboxylic acids in emulsion polymerizations have been limited to acidic mediums.

17 Claims, No Drawings

HIGH GREEN STRENGTH EMULSION RUBBERS BY THE USE OF HALF-ESTERS OF UNSATURATED DICARBOXYLIC ACIDS

TECHNICAL FIELD

This invention lies in the art of rubber compounds. Specifically, the invention concerns improvements in green strengths which are obtained with the use of half esters of unsaturated dicarboxylic acids and their derivatives in conventional emulsion polymerization (pH≧7.0) of synthetic rubber.

BACKGROUND ART

The green strength, or more specifically the lack of green strength of synthetic rubber is a significant hinderance to the use of synthetics in many applications. While green strength is a somewhat elusive physical property to quantify, as used in this specification it refers to those physical properties of an uncured elastomer which permit molding or construction of a multicomponenet article without subsequent "flow" or distortion prior to curing. Natural rubber commonly possesses these properties and it is partially for this reason that natural rubber is still used in many compound recipes, particularly those used in making large articles such as truck tires. Green strength is usually measured by stress/strain curves of unvulcanized compounds with the yield point and the ultimate or breaking tensile being the values used to quantify the amount of green strength.

Because synthetic materials commonly used as substitutes for natural rubber, e.g., styrene-butadiene rubber (SBR), polybutadiene, and the like, lack green strength, the substitution is not entirely satisfactory. To overcome this deficiency, a variety of compounds may be added to the compounding recipe in order to increase green strength.

One group of compounds which have been particularly useful in the improvement of green strength are the carboxyl-containing compounds. These compounds, however, must be copolymerized in order to be effective. Copolymerization has been found to be particularly difficult in standard emulsion polymerizations constituting the preferred processes for manufacture of SBR, polybutadiene and the like. The problem lies in the fact that standard emulsion polymerizations are carried out in a basic medium, that is, in an aqueous phase having a pH of between about 9 and 10, and under these conditions, the normally used carboxylic acids are neutralized into water soluble salts which are incorporated into the polymer backbone to a much smaller degree than are the acids themselves. This is due both to the fact that the salts are much less reactive than the acids, and that the salts tend to stay in solution in the aquaeous phase.

In the prior art, this problem was dealt with through the expedient of creating an acidic medium in which the carboxylic acids remain in the acid state and therefore less soluble. This process, however, carries with it a host of problems such as the need for corrosion resistant vessels and piping and the need for cationic surfactants. These changes from the standard emulsion polymerization process add considerably to the cost of manufacture.

The instant invention provides for the use of novel carboxyl-containing compounds which unexpectedly can be used in basic mediums in emulsion polymerizations while at the same time are sufficiently incorporated into the polymer so as to effect improved green strength. The compounds of this invention are half esters of dicarboxylic acids such as for example, maleic and fumaric acids. The ester moiety must be a rather long chained hydrocarbon which imparts to the half ester a degree of water insolubility. The half ester is thus less susceptible to attack by the basic medium of the standard emulsion polymerization process.

Prior art references which teach the use of carboxyl-containing compounds include U.S. Pat. No. 3,898,983 to Brancaccio which relates to the improvement of green strength of a polyisoprene through reaction with maleic acid. U.S. Pat. No. 3,897,403 to Yamauchi, et al, relates to the use of maleic anhyride in a reaction with synthetic cis-1,4 polyisoprene. Neither of these patents teach the use of water insoluble half esters of a dicarboxylic acid such as maleic acid or acid anhydride.

French Pat. No. 2,215,429 relates to the use of small amounts of various carboxylic acids with synthetic polymers such as polybutadiene and SBR to improve the green strength. There is no mention of the use of hydrophobic half esters of dicarboxylic acids such as fumaric or maleic.

U.S. Pat. No. 3,429,952 to Nordsiek, et al, discloses the use of unsaturated carboxylic acids to increase the tear resistance of cis-polybutadiene. It is not pertinent however, in that it teaches the neutralization of the carboxylic acids to form acid salts which cannot be utilized in the instant invention.

U.S. Pat. No. 2,880,186 to Barth, teaches the use of unsaturated carboxylic acids to produce strong elastic films having increased tear resistance. While this patent refers to emulsion polymerizations, an acid aqueous medium must be used. U.S. Pat. No. 3,475,362 to Romanick, et al, describes the use of carbon-containing compounds in rubber based adhesives. There is no mention made of the use of half esters of dicarboxylic acids.

U.S. Pat. No. 4,254,013 to Friedman, et al, describes improvements in green strength of elastomer blends obtained through the use of ionogenic compounds in the polymer chains. This application does not however teach the use of half esters of dicarboxylic acids.

Two articles in Rubber Chemistry and Technology disclose that unsaturated carboxylic acids may be copolymerized with olefins and dienes, Brown and Gibbs, Rubber Chemistry and Technology, Volume 28, page 938 (1955) and Brown, *Rubber Chemistry and Technology*, Volume 30, page 1347 et seq., (1957). These articles specifically refer to the problems associated with emulsion polymerizations of butadiene, SBR and other polymers in which carboxylic acids are incorporated. There is no suggestion of the use of half esters of dicarboxylic acids in emulsion polymerizations so as to allow polymerization in basic aqueous mediums.

DISCLOSURE OF INVENTION

It is therefore an object of the present invention to improve the green strength of emulsion polymerization rubbers.

It is another object of the present invention to improve the green strength of emulsion polymerization rubbers, as above, wherein the rubber comprises at least a synthetic elastomer and a half ester of an unsaturated dicarboxylic acid.

It is a further object of the present invention to improve the green strength of emulsion polymerization rubbers, as above, wherein conventional emulsion polymerization processes can be utilized.

It is yet another object of the present invention to improve the green strength of emulsion rubbers, as above, wherein the point of unsaturation of the dicarboxylic acid half ester is incorporated into the backbone of the polymer chain, and the half ester and discarboxylic groups are pendant therefrom.

It is still another object of the present invention to improve the green strength of emulsion polymerization rubbers, as above, wherein the half ester moiety contains at least 4 carbon atoms rendering the acid derivative hydrophobic and insoluble in the aqueous phase of an emulsion polymerization process.

It is still another object of the present invention to improve the green strength of emulsion polymerization rubbers, as above, wherein the pendant carboxylic moiety of the half ester forms an ionic bond with divalent metal ions, e.g., zinc ions which have been incorporated into the blend during compounding, thereby forming pseudo-crosslinks.

It is still another object of the present invention to improve the green strength of emulsion polymerization rubbers wherein the insoluble nature of the unsaturated dicarboxylic acid half ester prevents the neutralization of the carboxylic moiety in the basic medium of conventional emulsion polymerization processes thereby allowing a higher rate of copolymerization than would otherwise be possible.

It is still an additional object of the present invention to improve the green strength of emulsion polymerization rubbers, as above, wherein the blends may be utilized in making tires including truck tires, conveyor belts, rubber hoses, carpet backing and the like.

These and other objects of the present invention which will become more apparent as the detailed description of the specification proceeds are achieved by: a process for improving the green strength of elastomers, comprising: copolymerizing a monomer or monomers with from about 1 to 10 parts by weight per 100 monomer of a dicarboxylic acid derivative, said derivative being substantially hydrophobic; and compounding the copolymer with between 1 and 5 parts of a divalent metallic compound selected from the group consisting of zinc, magnesium, and calcium;

wherein said derivative is a half ester or half amide.

In general, an elastomer having improved green strength, comprising: a copolymer of one or more monomers and between 1 and 10 parts per 100 parts by weight monomer of a dicarboxylic acid derivative; said copolymer being compounded with between 1 and 5 parts of a divalent metallic compound; and wherein said derivative is substantially hydrophobic and is selected from the group consisting of half esters and half amides.

BEST MODE FOR CARRYING OUT THE INVENTION

The instant invention eliminates the need for providing an acidic emulsion polymerization medium when polymerizing one or more monomers with carboxyl-containing compounds. It has unexpectedly been found that half ester and half amides of certain dicarboxylic acids are sufficiently water insoluble to allow their use in conventional emulsion polymerization systems normally having an initial pH of between 8.5 and 12. Generally, the acid moiety contains at least one conjugated double bond which is incorporated into the polymer chain, with the ester or amide group and the carboxyl group being pendant therefrom. By the term "monomers" is meant non half ester and non half amide compounds which ae copolymerized with the half ester or half amide.

Elastomers which may be prepared by emulsion polymerization and which may be improved by utilization of the instant invention include dienes having from 4 to 12 and preferably from 4 to 6 carbon atoms such as isoprene, butadiene and the like; copolymers of said dienes and vinyl substituted aromatics having from 8 to 12 carbon atoms with styrene-butadiene (SBR) being preferred; nitrile rubbers, that is, copolymers of butadiene, acrylonitrile and optionally one or more monomers selected from the group consisting of acrylic, methacrylic and itaconic acids; polychloroprene (neoprene); and acrylate, such as ethylacrylate, butylacrylate and 2-ethylhexylacrylate.

The emulsion polymerization process is well known to those skilled in the art and involves the free radial initiation and propagation of polymer chains in an aqueous continuous phase. Typical emulsion systems contain water, monomers, an initiator, and an emulsifier, commonly a rosin soap, a fatty acid, etc.

The half esters of the dicarboxylic acids are prepared from the esterification reaction between the acid or acid anhyride and the corresponding alcohol. The dicarboxylic acid or acid anhydride must contain at least one point of unsaturation and may be alkyl or cycloalkyl having from 4 to 12 carbon atoms. Highly preferred are maleic acid, maleic anhydride, and fumaric acid. Itaconic acid may also be used.

Suitable alcohols include saturated alkyl alcohols having from 4 to 20 carbon atoms, desirably having between 6 and 12 carbon atoms with from 7 to 9 preferred; cycloalkyl alcohols having from 4 to 20 carbon atoms, desirably from 4 to 12 and preferably from 7 to 9 carbon atoms; aromatic alcohols having from 6 to 10 carbon atoms with phenol preferred; and alkyl substituted aromatic alcohols having from 7 to 20 carbon atoms with from 7 to 12 being preferred.

As mentioned above, amides may be used in lieu of esters. That is, the dicarboxylic acids or anhydrides may be reacted with a saturated amine having from 4 to 20 carbon atoms with between 6 and 12 being preferred. A half-amide is thus formed which is incorporated into the polymer backbone in the manner set forth above for the half esters. The half-amide is of course water insoluble to approximately the same extent as a half ester having the same number of carbon atoms and is prepared by any conventional method, e.g., the reaction of a primary or secondary amine with a dicarboxylic acid in which one carboxylic moiety has been converted to an acid chloride. It will be understood that any discussion in this disclosure with reference to a half ester is equally applicable to a half amide, that is, the amounts, ranges, etc., are the same for the half amide.

The dicarboxylic acid half ester which is preferred is 2-ethyl-1-hexyl maleic acid ester (EHMAE). This compound is readily prepared by combining equimolar amounts of maleic anhydride and 2-ethyl-1-hexanol and heating the mixture slowly with agitation until an exotherm develops, signifying formation of the half ester. The example given hereinbelow provides additional details on the preparation of EHMAE and other half esters.

The amounts of the half esters which are added to the recipes vary with the type of polymer being produced but fall within the range of from 1 and about 10 parts by weight per hundred parts by weight of total monomer with about from 2 and 5 parts being preferred. In the case of a styrene-butadiene copolymerization, the half ester is normally added to the recipe at the expense of the same number of parts of styrene.

While some unreacted half ester remains, it is estimated that between about 60 and 90 percent of the half ester is incorporated into the polymer chain. The exact amount is difficult to measure because some monomeric half ester may remain in the polymer.

The half esters of the invention may be utilized in conventional emulsion polymerization processes having a pH of between 8.5 and 12. This was totally unexpected because it was heretofore believed that the carboxylic moiety would form a salt in a basic medium regardless of the relative solubility of any pendant group in the basic medium. However, use of the selected half esters results in a final pH of approximately 6 yet does not effect the action of the fatty acid or rosin acid soaps commonly employed in emulsion polymerizations as the half esters are substantially water insoluble, that is, greater than 9.5% insoluble.

Copolymers incorporating the half esters of the instant invention may be compounded in conventional recipes with one exception that a divalent metallic compound must be included in the recipe. A common divalent metal used in many elastomer recipes for other purposes is zinc. Other divalent metals which are also satisfactory include calcium, magnesium, and the like. The divalent metals must be present in the recipe between about 1 and 5 parts by weight per hundred parts by weight of polymer with about between 2 and 4 being preferred.

The copolymer is compounded otherwise in a conventional fashion with other ingredients such as accelerators, antioxidants, carbon blacks, processing oils, fillers and the like.

The following examples illustrate the synthesis of half esters of unsaturated dicarboxylic acids, and the emulsion polymerization process in which they are used.

It is noted that, in all the examples, the reaction of the rosin acid soap and the caustic soda (NaOH) is carried out prior to the addition of the half ester. This is done to minimize the possibility of neutralization of the half ester which, in spite of its relative insolubility, would be attacked by the caustic soda to a certain extent and rendered water soluble. Once the proper pH has been reached prior to addition of the monomers, however, the half ester (or half amide) may be added without significant neutralization occurring. Neutralization is further hindered by the temperature of the polymerization, which is carried out at between 32° and 68° F. and preferably at about 50° (10° C.).

The SBR rubber of Example I was compounded using the following recipe, which was mixed in a BR Banbury for three minutes at 70 RPM:

| COMPOUND FORMULATION | |
|---|---|
| Rubber | 100 |
| FEF Carbon Black | 50 |
| Tackifier | 4.75 |
| Processing Oil* | 17.25 |
| Stearic Acid | .50 |
| Zinc Oxide | 3 |

*Includes 11.25 PHR from oil-extended SBR.

As a control, SBR lacking the half ester was also compounded as above. Table I compares physical properties of the control and the SBR of Example I. Increases of at least about 100% can be realized in modulus when the half ester is used. Tensile-to-break is also increased while elongation-to-break is decreased signifying a stiffer compound.

Table II compares the relative amounts of incorporation of EHMAE in the polymers of Examples II and III at various conversions using various analytical techniques. The somewhat lower values using infrared (IR) and nuclear magnetic resonance (NMR) spectroscopy compared to acid-base titration reflect analytical procedures prior to analysis. In order to eliminate the possibility of having unbound ester in the polymer, the polymer was passed through a low molecular weight gel permeation chromatography (GPC) column and a sample corresponding to the polymer peak only was collected. The IR and NMR spectra of Examples II and III were then compared to reference compounds made by blending polybutadiene with 2-ethyl-1-hexyl succinic acid-ester in a 95/5 ratio.

As can be seen from Table II, incorporation of the half-ester is much greater than when it is in the unneutralized state, i.e., at least twice as great as the neutralized EHMAE.

EXAMPLE I

Preparation of Half Esters

The half esters are prepared through a standard esterification reaction exemplified by that for the preparation of ethyl-hexyl-maleic acid ester (EHMAE). 196 grams maleic anhydride (2 moles) and 260 grams 2-ethyl-1-hexanol (2 moles) were heated slowly in a 1,000 ml beaker with agitation using a hot plate. The maleic anhydride melted at around 60° C. and the resulting two phases become one at 80° C. and clear. Upon further heating, a slow exotherm developed and heating was discontinued. The temperature peaked at about 140° C. The temperature was held at 130° C. for 15 minutes and then the batch was allowed to cool. Yield was approximately 95–100%. n-Butyl maleic acid-ester may be prepared in a similar fashion using equimolar quantities of maleic anhydride and n-butanol.

Polymerization of SBR-EHMAE

The following recipe was used to produce a copolymer of styrene-butadiene and EHMAE.

| | | Parts+ |
|---|---|---|
| A | Water (Deionized) | 190.0 |
| | Tallow Fatty Acids | 2.09 |
| | NaOH | To pH 10.4 |
| | Dresinate 214 (Rosin Acid Soap) | 2.81 |
| | Na$_3$PO$_4$ | 0.30 |
| | Tamol N (Na Salt of condensed naphthalene sulfonic acid) | 0.13 |
| B | Styrene | 20.5 |
| | Tertiary C$_{12}$ Mercaptan | 0.24 |
| | EHMAE* | 5.0 |
| C | Water | 10.00 |
| | H$_2$SO$_4$ | 0.002 |
| | FeSO$_4$.7H$_2$O | 0.04 |
| | Versene 100 (tetrasodium ethylene diamine tetraacetate) | 0.024 |
| | K$_4$P$_2$O$_7$.3H$_2$O | 0.064 |
| | Sodium Formaldehyde Sulfoxylate | 0.024 |
| D | Butadiene | 75.00 |
| E | Styrene | 4.50 |
| | Paramenthane hydroperoxide (50%) | 0.12 |
| F** | Na dimethyl dithiocarbamate | .25 |

-continued

|  | Parts+ |
|---|---|
| Diethyl hydroxyamine | .05 |

Polymerization Temperature: 50° F. = 10° C.
*EHMAE Range: 1–10 parts
Optimum level 3–4 parts
Normally EHMAE would be put into the recipe at the expense of same number of parts of styrene.
+All parts are parts by weight per hundred parts monomer.
**Shortstop as 5% sol" in $H_2O$.

The ingredients in "A" were added to a 5 gallon reactor with the NaOH added last in an amount sufficient only to bring the pH to 10.4. "B" was then added, the charge port closed, and the reactor vessel purged of air by successive evacuations and pressurizations with $N_2$. The activator solution, "C", was then pressured into the sealed vessel followed by the addition of "D", after the butadiene had been washed successively with caustic and water. The batch was then cooled to 10° C. followed by the addition of "E". The polymerization was run until approximately 60% conversion was reached which corresponds to roughly 22% solids in the aqueous solution. At this point the shortstop solution "F" was added to kill polymerization. The polymer obtained was then isolated, washed and squeeze dried.

EXAMPLE II

Polymerization of BD/EHMAE

A 95/5 BD/EHMAE copolymer was made in a 5 gallon reactor according to the following recipe and using the same procedure as in Example I.

|  |  | Parts+ |
|---|---|---|
| A | Water (Deionized) | 190.0 |
|  | Tallow Fatty Acids | 2.09 |
|  | NaOH | To pH 10.4 |
|  | Dresinate 214 (Rosin Acid Soap) | 2.81 |
|  | $Na_3PO_4$ | 0.30 |
|  | Tamol N (Na salt of condensed naphthalene sulfonic acid) | 0.13 |
| B | Tertiary $C_{12}$ Mercaptan | 0.24 |
|  | EHMAE* | 5.0 |
| C | Water | 10.00 |
|  | $H_2SO_4$ | 0.002 |
|  | $FeSO_4.7H_2O$ | 0.04 |
|  | Versene 100 (tetrasodium ethylene diamine tetraacetate) | 0.024 |
|  | $K_4P_2O_7.3H_2O$ | 0.064 |
|  | Sodium Formaldehyde Sulfoxylate | 0.024 |
| D | Butadiene | 95.00 |
| E | Paramenthane hydroperoxide (50%) | 4.50 |
| F** | Na dimethyl dithiocarbamate | .25 |

-continued

|  | Parts+ |
|---|---|
| Diethyl hydroxylamine | .05 |

Polymerization Temperature: 50° F. = 10° C.
*EHMAE Range: 1–10 parts
Optimum level 3–4 parts
Normally EHMAE would be put into the recipe at the expense of same number of parts of styrene.
+All parts are by weight per hundred parts monomer.
**Shortstop as 5% sol" in $H_2O$.

EXAMPLE III

Polymerization of BD/Neutralized EHMAE

The same procedure was followed as in Example II, except that the EHMAE was neutralized with sodium hydroxide. This run was made to compare the degree of copolymerization of neutralized and unneutralized EHMAE.

The following tables summarize the degree of incorporation of the half ester observed in the various examples.

TABLE I

| PERCENT OF EHMAE IN BD/EHMAE COPOLYMER | | | | | | |
|---|---|---|---|---|---|---|
| % EHMAE |  | $M_{100}$ | $M_{300}$ | $M_{500}$ | TB | EB |
| 0 | Control | 53,53,54 | 72,70,72 | 102,97,101 | 151,131,165 | 840,745,950 |
| 5 | A | 104,94,100 | 182,172,175 | 247,237,— | 280,253,218 | 615,570,450 |
| 5 | B | 99,93,89 | 166,165,161 | 221,220,220 | 254,247,274 | 640,420,720 |
| 0 | Control | 44,47,48 | 59,63,36 | 83,89,86 | 124,117,121 | 980,740,810 |

$M_{100}$ = 100% Modulus (PSI)
$M_{300}$ = 300% Modulus (PSI)
$M_{500}$ = 500% Modulus (PSI)
TB = Tensile to Break (PSI)
EB = Elongation to Break

TABLE II

| % OF EHMAE IN 95/5 BD/EHMAE COPOLYMERS MEASURED AT VARIOUS CONVERSIONS BY VARIOUS METHODS | | | | | |
|---|---|---|---|---|---|
|  |  | Conversion (%) | Acid-Base Titration | IR | NMR |
| EHMAE (unneutralized) | 1 | 14.4 | 10.1 |  |  |
|  | 2 | 24.8 | 6.0 | ~3–4 | ~3 |
|  | 3 | 32.4 | 4.7 |  |  |
|  | 4 | 39.5 | 4.0 |  |  |
|  | 5 | 49.0 | 3.0 | ~1–2 | ~1 |
|  | 6 | 60.0 | 2.7 |  |  |
| EHMAE (neutralized) | 1 | 17.0 | <1 |  |  |
|  | 2 | 28.0 | <1 |  |  |
|  | 3 | 31.5 | <½ |  |  |
|  | 4 | 39.2 | <½ |  |  |
|  | 5 | 51.0 | <½ |  |  |

As can be seen from the table, EHMAE is incorporated into the copolymer to a considerable extent. Table I illustrates the amount of half ester incorporation into an SBR copolymer while Table II shows incorporation EHMAE in polybutadiene using both neutralized and unneutralized half ester. It can be seen from Table II that the neutralized EHMAE is incorporated to a much lesser extent than is the unneutralized, confirming the observation made previously.

While in accordance with the Patent Statutes, only the best mode and the preferred embodiments have been illustrated, it is to be understood that the invention is not limited thereto or thereby. Accordingly, the scope of the invention should be measured by the following claims.

What is claimed is:

1. A process for improving the green strength of elastomers, comprising:
   copolymerizing a monomer or monomers with from about 1 to 10 parts by weight per 100 parts of said monomer of a acid derivative, said monomer or monomers selected from the group consisting of (a) dienes having from 4 to 12 carbon atoms, (b) a diene having from 4 to 12 carbon atoms and a vinyl substituted aromatic having from 8 to 12 carbon atoms, (c) butadiene and acrylonitrile and optionally one or more monomers selected from the group consisting of acrylic, methacrylic and itaconic acids, and (d) polychloroprene, said derivative being a half ester or a half amide and being substantially hydrophobic, said derivative being the reaction product of (1) an alcohol or a saturated amine and (2) a dicarboxylic acid or acid anhydride; and
   compounding said copolymer with between 1 and 5 parts of a divalent metallic salt selected from the group consisting of salts of zinc, magnesium and calcium.

2. A process according to claim 1, wherein said dicarboxylic acid or acid anhydride is selected from the group consisting of an alkyl acid, a cycloalkyl acid, and an acid anhydride having from 4 to 12 carbon atoms and at least one conjugated carbon-carbon double bond;
   wherein said alcohol is selected from the group consisting of a saturated alkyl alcohol having from 4 to 20 carbon atoms, a cycloalkyl alcohol having from 4 to 20 carbon atoms, an aromatic alcohol having from 6 to 10 carbon atoms and an alkyl substituted aromatic alcohol having from 7 to 20 carbon atoms; and
   wherein said saturated amine is selected from the group consisting of a primary amine and a secondary having from 4 to 20 carbon atoms.

3. A process according to claim 2, wherein said derivative is incorporated into the backbone of said elastomer at a point of unsaturation, said half ester or half amine and carboxylic acid or acid anhydride, moieties being pendant therefrom, and including making said copolymer by emulsion polymerization at a pH of from about 8.5 to about 12.

4. A process according to claim 3, wherein said carboxylic acid moieties form ionic bonds with the metallic ion of said divalent metallic compound and wherein said half ester is formed from the esterification reaction of an unsaturated dicarboxylic acid or anhydride selected from the group consisting of maleic acid, maleic anhydride, itaconic acid and fumaric acid.

5. A process according to claim 4, wherein the amount of said half ester in said copolymer is from about 2 to about 5 parts per 100 parts of monomer.

6. A process according to claim 5, wherein said alcohol is selected from the group consisting of alkyl alcohols having from 7 to 9 carbon atoms.

7. A process according to claims 1, 2, 4 or 6, wherein said half ester is 2-ethyl-1-hexyl maleic acid ester.

8. A process according to claim 7, wherein said monomers are selected from the group consisting of butadiene, butadiene and styrene, butadiene and acrylonitrile, and combinations thereof.

9. A process according to claim 8, wherein said monomers are styrene and butadiene, and wherein said divalent metallic salt is zinc oxide.

10. An elastomer having improved green strength, comprising:
    a copolymer of one or more monomers and from about 1 to about 10 parts per 100 parts by weight of said monomer of an acid derivative, said monomer or monomers selected from the group consisting of (a) dienes having from 4 to 12 carbon atoms, (b) a diene having from 4 to 12 carbon atoms and a vinyl substituted aromatic having from 8 to 12 carbon atoms, (c) butadiene and acrylonitrile and optionally one or more monomers selected from the group consisting of acrylic, methacrylic and itaconic acids, and (d) polychloroprene;
    said copolymer being compounded with between 1 and 5 parts of a divalent metallic salt selected from the group consisting of salts of zinc, magnesium, and calcium;
    wherein said acid derivative is substantially hydrophobic and is selected from the group consising of half esters and half amides and is the reaction product of (1) an alcohol or a saturated amine and (2) a dicarboxylic acid or acid anhydride.

11. An elastomer according to claim 10, wherein said dicarboxylic acid or acid anhydride is selected from the group consisting of an alkyl acid, a cycloalkyl acid, and an acid anhydride having from 4 to 12 carbon atoms and at least one conjugated carbon-carbon double bond;
    wherein said alcohol is selected from the group consisting of a saturated alkyl alcohol having from 4 to 20 carbon atoms, a cycloalkyl alcohol having from 4 to 20 carbon atoms, an aromatic alcohol having from 6 to 10 carbon atoms and an alkyl substituted aromatic alcohol having from 7 to 20 carbon atoms; and
    wherein said saturated amine is selected from the group consisting of a primary amine and a secondary amine having from 4 to 20 carbon atoms.

12. An elastomer according to claim 11, wherein said dicarboxylic acid derivative is incorporated into the backbone of said copolymer at a point of unsaturation, said half ester or half amide and the carboxylic acid or acid anhydride moieties being pendant therefrom.

13. An elastomer according to claim 12, wherein said carboxylic acid moieties form ionic bonds with the metallic ions of said divalent metallic compound, and wherein a half ester is formed from the esterification reaction of an acid or anhydride selected from the group consisting of maleic acid, maleic acid anhydride, itaconic acid and fumaric acid.

14. An elastomer according to claim 13, wherein said alcohol is selected from the group consisting of an alkyl alcohol having from 7 to 9 carbon atoms.

15. An elastomer according to claims 10, 11, 13 or 14 wherein said half ester is 2-ethyl-1-hexyl maleic acid ester.

16. An elastomer according to claim 15, wherein said monomers are styrene and butadiene, said divalent salt being $z_nO$.

17. An elastomer according to claim 15, wherein said monomer is butadiene, said divalent salt being $z_nO$.

* * * * *